UNITED STATES PATENT OFFICE.

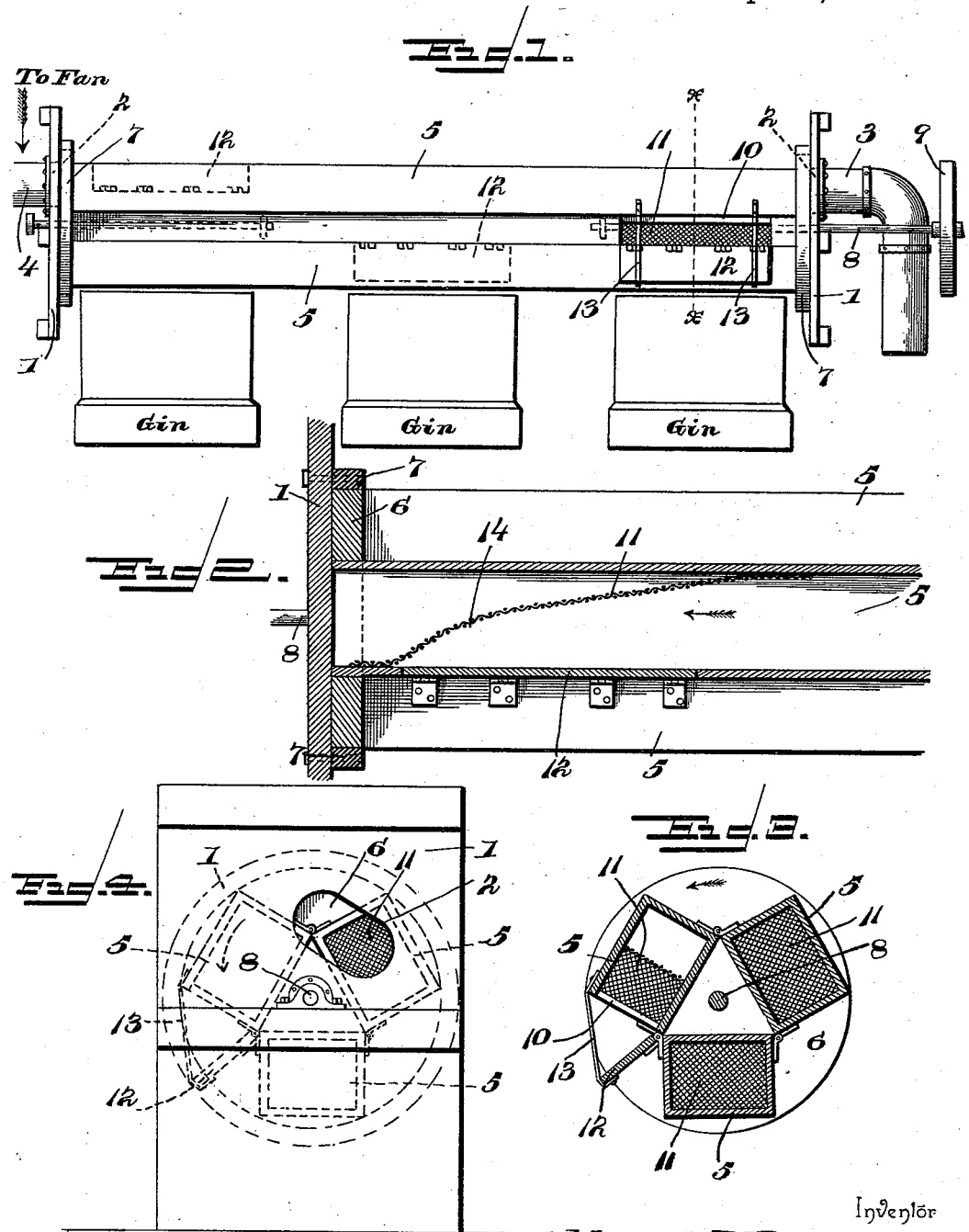

HERBERT A. PAINE, OF WACO, TEXAS.

COMBINED COTTON SEPARATOR AND DISTRIBUTER.

SPECIFICATION forming part of Letters Patent No. 525,428, dated September 4, 1894.

Application filed April 17, 1894. Serial No. 507,914. (No model.)

*To all whom it may concern:*

Be it known that I, HERBERT A. PAINE, a citizen of the United States, residing at Waco, in the county of McLennan and State of Texas, have invented a new and useful Combined Cotton Separator and Distributer, of which the following is a specification.

This invention relates to cotton separators and distributers; and it has for its object to provide a combined machine of this character that shall contain simple and efficient means for elevating and conveying seed cotton from the wagon or other suitable point, and evenly distributing the cotton to one or more gins.

To this end the main and primary object of the present invention is to construct a simple and efficient combined separator and distributer that shall provide means for economically elevating, separating, and distributing seed cotton.

With these and other objects in view which will readily appear as the nature of the invention is better understood, the same consists in the novel construction, combination and arrangement of parts hereinafter more fully described, illustrated and claimed.

In the accompanying drawings:—Figure 1 is a side elevation of a combined separator and distributing machine constructed to feed three gins in series. Fig. 2 is an enlarged sectional view of a portion of one of the distributing boxes. Fig. 3 is a transverse sectional view on the line $x-x$ of Fig. 1. Fig. 4 is an end view of the machine.

Referring to the accompanying drawings, 1, 1 designate opposite upright end frames that are suitably supported in any convenient position so as to dispose the machine supported thereby directly over the cotton gins that are to be fed, and said end frames are arranged at distances apart according to the length of the machine, which is regulated according to the number of gins that are to be fed, and at suitable points therein the said upright end frames are provided with the openings 2, over one of which openings, in one of the end frames, is securely fitted one end of the cotton supply pipe 3, that leads to a wagon or other suitable source of supply, and the opening 2, in the opposite end frame is covered by one end of the suction pipe 4, that connects with a suitable suction fan for creating a suction within the said pipe, and it is to be observed that the openings 2, are in direct longitudinal alignment, which therefore disposes the ends of the pipes 3 and 4 connected to the frames 1, in the same alignment.

Supported to rotate between the opposite upright end frames 1, are a series of elongated distributing boxes or pipes 5. The distributing boxes or pipes 5, are preferably constructed rectangular in cross section and are perfectly tight throughout their entire lengths so that a suction of air may be maintained therein to carry the cotton to the point of discharging, and said distributing boxes are arranged in a circular group with their opposite ends fitted into the opposite circular box heads or disks 6, that are arranged to work close against the inner sides of the end frames 1, and within the circular rubber gasket 7, secured to the inner sides of said end frames for the purpose of forming a substantially air-tight joint between the frames and the turning or rotating box-heads or disks 6.

The circularly grouped elongated distributing boxes are circularly united in any suitable manner and the same, including the heads 6, are preferably supported on the end shafts 8, to one of which may be attached a belt wheel or pulley 9, to receive a belt from a suitable motor for communicating a slow rotary movement to the series of distributing boxes, but any other suitable means may be employed for transmitting motion to these boxes. While the elongated distributing boxes or pipes have been described as circularly grouped, it will be obvious that the same may be otherwise suitably assembled together for a simultaneous rotation, and in any arrangement of the boxes one of the same is used for each gin, so that each gin or other receptacle to which the cotton is distributed has one particular distributing box for feeding the same.

As illustrated and described, the several elongated distributing boxes longitudinally grouped together, extend from one frame head to the other and are adapted to have their open ends turned or swung in a circle of movement that includes the openings in the end frames and therefore includes the supply and suction pipes of the apparatus, so that, at every complete revolution, each distributing box is brought into direct alignment with the supply and suction pipes, whereby a suction will be caused therein so as to draw in a supply of cotton from the pipe 3, and provide means for feeding or distributing it to the gin or other receptacle. Each of the elongated distributing boxes is provided in that side which is brought directly over the gin or other receptacle by its own rotation, with a cotton discharge opening 10, directly opposite which and within the box is an inclined separating screen 11, attached at its ends to directly opposite sides of the box so as to prevent the cotton from being drawn by the suction beyond the discharging opening, while at the same time providing means for relieving the cotton somewhat of the sand, dirt, &c., therein. The discharge openings in one side of the elongated distributing boxes are arranged at a point in alignment above the gin or other receptacle into which the cotton is to be fed, and, therefore, when the machine is feeding a series of gins the cotton discharge openings in the several boxes are out of alignment so as to admit of each box feeding to its own gin or other receptacle.

At one edge of the discharging openings of each distributing box is hinged a gravity drop door 12, that is adapted to work over the opening 10, and has connected to opposite edges thereof the stop straps 13, also connected to one side of the distributing box so as to limit the opening of the door. The gravity doors 12 of each distributing box are adapted to automatically drop open as the boxes rotate to a position directly over the gin to be fed, and thereby allow the cotton caught by the screens 11, to fall into the gin. As the distributing boxes rise up above the gin the doors automatically close so that the suction may be maintained through the box when it reaches the line of suction, and in order to provide for the proper accumulation of cotton at the discharge openings and for a more thorough separating action thereon, the separating screens 11, are slightly curved inwardly from the door openings as at 14.

From the above it will be seen that in order to supply the distributing boxes with cotton it is simply necessary to bring the same into alignment with the supply and suction pipes as already described, by means of a slow rotation, but to accomplish this result it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a cotton handling apparatus of the class described, the combination of opposite aligned supply and suction pipes, an air tight open-ended cotton distributing box or pipe having a door inclosed discharge opening, in one side and means for moving the open ends of the distributing box in and out of alignment with the supply and suction pipes at intervals, substantially as set forth.

2. In a cotton handling apparatus of the class described, the combination of opposite aligned supply and suction pipes, an open-ended cotton distributing box having a door inclosed discharge opening in one side, a screen arranged transversely within the box opposite the discharge opening and curved inwardly from such opening, and means for moving the distributing box in and out of alignment with said pipes, substantially as set forth.

3. In a combined cotton separator and distributer, opposite aligned supply and suction pipes, a cotton distributing box open at both ends and adapted to be moved in and out of alignment with said pipes, said box being provided in one side with a door inclosed discharge opening, and an inclined separating screen arranged transversely within the box opposite said discharge opening, substantially as set forth.

4. In a combined cotton separator and distributer, opposite aligned supply and suction pipes, a cotton distributing box open at both ends and adapted to be moved in and out of alignment with said pipes, said box being provided in one side with a discharge opening, a gravity drop door arranged to work over said opening, and an inclined screen arranged transversely within the box opposite said opening, substantially as set forth.

5. In a combined cotton separator and distributer, opposite aligned supply and suction pipes, a circular group of elongated open-ended distributing boxes mounted for rotation between said pipes and each provided with door inclosed discharge openings, out of circular alignment with each other, and screens arranged in the boxes opposite their discharge openings substantially as set forth.

6. In a combined cotton separator and distributer, opposite upright end frames having respectively supply and suction openings, gasket rings arranged at the inner sides of said end frames, rotary box heads or disks arranged to work inside of said gaskets, and a series of circularly grouped elongated distributing boxes mounted at their opposite ends in said heads and provided with door inclosed discharge openings, and screens opposite said openings substantially as set forth.

In testimony that I claim the foregoing as my own I have hereto affixed my signature in the presence of two witnesses.

HERBERT A. PAINE.

Witnesses:
S. M. SPEAKE,
T. M. DILWATTE.